G. H. MERWIN.
JOURNAL SUPPORT.
APPLICATION FILED OCT. 27, 1909.
1,012,213.
Patented Dec. 19, 1911.
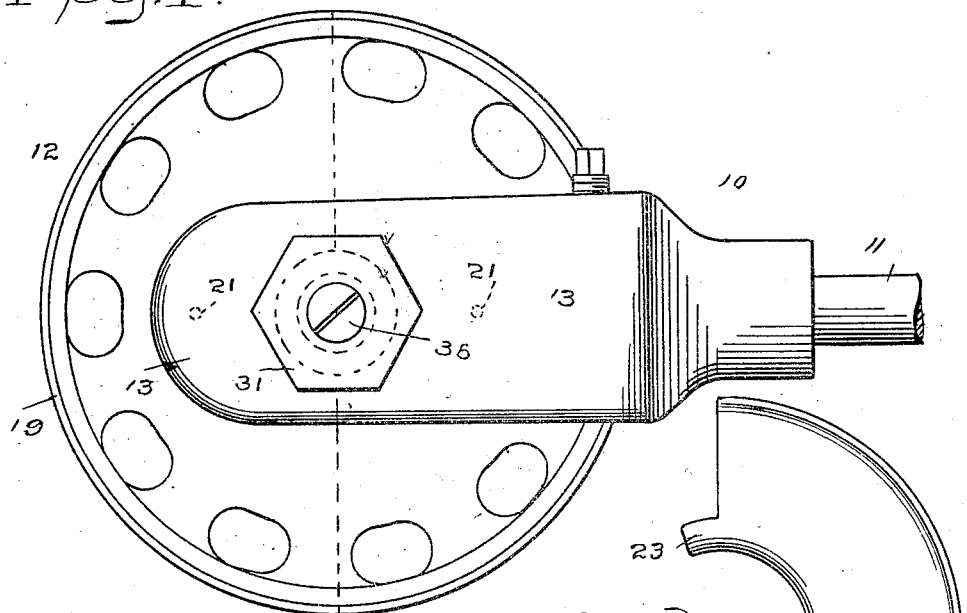
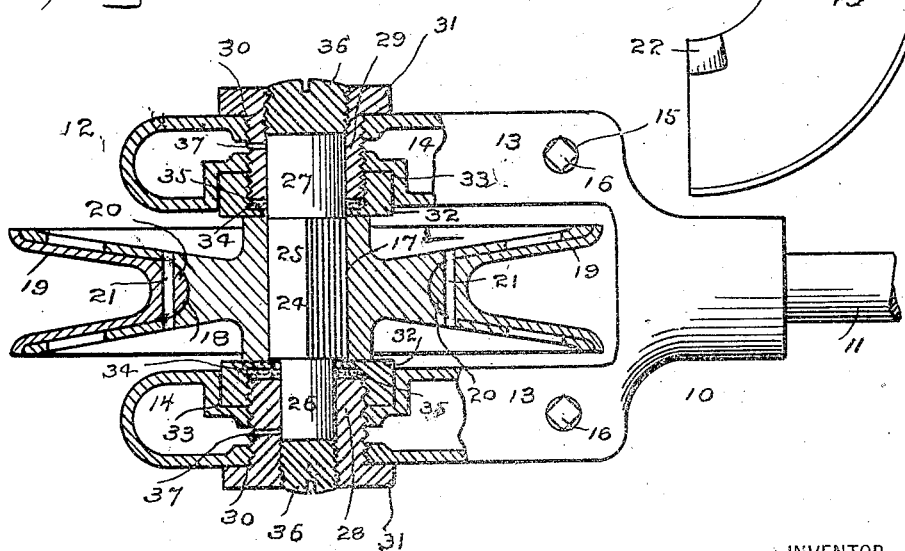
WITNESSES:
INVENTOR
George H. Merwin
BY
ATTORNEY

UNITED STATES PATENT OFFICE.

GEORGE H. MERWIN, OF MILFORD, CONNECTICUT.

JOURNAL-SUPPORT.

1,012,213.  Specification of Letters Patent.  Patented Dec. 19, 1911.

Application filed October 27, 1909. Serial No. 524,894.

*To all whom it may concern:*

Be it known that I, GEORGE H. MERWIN, a citizen of the United States, residing at Milford, county of New Haven, State of Connecticut, have invented an Improvement in Journal-Supports, of which the following is a specification.

This invention has for its object to provide a trolley head and trolley wheel in which the size of the head and the number of parts shall be reduced, in which the parts may be easily and quickly assembled, in which the trolley wheel shall be self-oiling and shall be provided with removable bearing plates and in which the cost of construction of both head and trolley wheel shall be reduced, the durability shall be increased and the operation of the structure as a whole shall be greatly improved.

With these and other objects in view I have devised the novel trolley head and trolley wheel which I will now describe, referring to the accompanying drawing forming a part of this specification and using reference characters to indicate the several parts:

Figure 1 is a side elevation of my novel trolley head and trolley wheel complete; Fig. 2 a plan view partly in horizontal section; and Fig. 3 is a view of one of the bearing plates removed.

10 denotes the trolley head as a whole, 11 the pole and 12 the trolley wheel. The head comprises arms 13 between which the trolley wheel is pivoted. Each arm is provided with an oil reservoir 14 having a filling opening 15 closed by a screw cap 16. The trolley wheel is cast in a single piece and is provided with an angular central opening 17, shown in the present instance as made square, and with a peripheral groove 18 in which detachable bearing plates 19 are secured. The bearing plates are semicircular in form and are shaped to correspond with the groove in the trolley wheel.

An important feature of construction is that the bearing plates are provided with thickened portions 20 below the grooves therein which provide ample wearing surface for engagement with the current wire (not shown) and provide a solid body through which the rivets 21 pass by which the bearing plates are secured to the trolley wheel. Each bearing plate is provided with a recess 22 at one end and at the other end with a lug 23 which engages the corresponding recess in the other plate, thus locking the plates securely together.

24 denotes the shaft which is provided with an angular central portion 25 which corresponds with and fits closely in the central opening in the trolley wheel so as to carry the latter. One end of the shaft is provided with a reduced journal 26 and the other end with a journal 27 which may be of uniform diameter with or of slightly greater diameter than the greatest diameter of the angular portion. Journal 26 rotates in a bearing 28 and journal 27 in a bearing 29. These bearings are threaded to engage correspondingly threaded holes 30 in the arms of the head and are provided with heads 31 which bear upon the outer faces of the arms. The bearings also engage nuts 32 which are socketed in recesses 33 in the inner faces of the arms and are provided with sockets 34 which receive packing 35 and form stuffing boxes to prevent leakage of oil from the reservoirs. The central openings in the bearings are shown as extending through them and as closed by screw plugs 36. Oil from the reservoirs passes to the shaft through openings 37 in the bearings. The recessing of nuts 32 into the inner faces of the arms of the head enables me to greatly reduce the size of the head while at the same time ample strength is provided and oil reservoirs are also provided.

The mode of assembling is as follows: The bearing which receives journal 26 and the corresponding nut are placed in position, the other nut is placed in position, then the trolley wheel is placed between the nuts. The head is then turned to substantially the position shown in Fig. 2 with the bearing for journal 26 downward, then the shaft is dropped to place and the bearing for journal 27 is then turned into engagement with the corresponding nut. The operation is then completed by tightening up the bearings and nuts, and placing the plugs 36 in position. This leaves the trolley accurately centered and free to rotate between the nuts.

Having thus described my invention I claim:

1. The combination with a support provided with arms each having a chamber forming an oil reservoir, coinciding threaded openings being formed in the side walls of each chamber, of an exteriorly threaded perforated bearing sleeve engaging the threaded openings of each chamber, said sleeves having interiorly threaded bores of different diameters and each having its outer end provided with an integral head adapted to bear against the contiguous outer face of said trolley support, a nut working on the other end of each sleeve and coöperating with said head to clamp the sleeve in position, a wheel lying between said nuts, a shaft having a reduced journal adapted to engage the sleeve having the smaller bore, whereby said bearing sleeves may be first secured in position, the wheel then inserted in position and said shaft may be successively passed through the sleeve having the larger bore and said trolley wheel in assembling and threaded plugs engaging the interiorly threaded bores of the respective bearing sleeves to close said bores.

2. The combination with a support provided with arms each having a chamber forming an oil reservoir, coinciding threaded openings being formed in the side walls of each chamber, of an exteriorly threaded perforated bearing sleeve engaging the threaded openings of each chamber, said sleeves having interiorly threaded bores of different diameters and each having its outer end provided with an integral head adapted to bear against the contiguous outer face of said trolley support, a nut working on the other end of each sleeve and coöperating with said head to clamp the sleeve in position, the inner wall of each chamber being provided with an exterior recess to receive said nut, a wheel lying between said nuts, a shaft having a reduced journal adapted to engage the sleeve having the smaller bore, whereby said bearing sleeves may be first secured in position, the wheel then inserted in position and said shaft may be successively passed through the sleeve having the larger bore and said trolley wheel in assembling and threaded plugs engaging the interiorly threaded bores of the respective bearing sleeves to close said bores.

In testimony whereof I affix my signature in presence of two witnesses.

GEORGE H. MERWIN.

Witnesses:
  A. M. WOOSTER,
  S. W. ATHERTON.